United States Patent
Huang et al.

(10) Patent No.: US 12,255,536 B2
(45) Date of Patent: Mar. 18, 2025

(54) POWER CONVERSION SYSTEM, POWER CONVERSION MODULE, AND PROCESSING APPARATUS

(71) Applicant: Huawei Digital Power Technologies Co., Ltd., Shenzhen (CN)

(72) Inventors: Zhuyong Huang, Dongguan (CN); Xiaofei Zhang, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 17/979,058

(22) Filed: Nov. 2, 2022

(65) Prior Publication Data

US 2023/0137732 A1     May 4, 2023

(30) Foreign Application Priority Data

Nov. 3, 2021 (CN) .......................... 202111294152.3

(51) Int. Cl.
    *H02J 13/00*           (2006.01)
    *H02M 3/335*         (2006.01)

(52) U.S. Cl.
    CPC ..... *H02M 3/3353* (2013.01); *H02J 13/00017* (2020.01)

(58) Field of Classification Search
    CPC .. H02M 3/3353; H02M 1/007; H02M 1/0074; H02M 5/4585; H02M 3/335; H02J 13/00017; H02J 1/102; H02J 13/00; Y02B 90/20; Y04S 40/124

USPC .......................................................... 307/82
See application file for complete search history.

(56) References Cited

U.S. PATENT DOCUMENTS

| | | | |
|---|---|---|---|
| 2012/0113698 A1 | 5/2012 | Inoue et al. | |
| 2012/0205985 A1* | 8/2012 | Inakagata | H02J 3/46 |
| | | | 307/82 |
| 2016/0079881 A1* | 3/2016 | Barbosa | H02M 7/49 |
| | | | 307/11 |
| 2018/0262117 A1 | 9/2018 | Lu et al. | |
| 2021/0091676 A1 | 3/2021 | Li | |
| 2023/0344355 A1* | 10/2023 | Poon | H02M 1/0035 |

FOREIGN PATENT DOCUMENTS

| | | |
|---|---|---|
| CN | 102891501 A | 1/2013 |
| CN | 103731022 A | 4/2014 |
| CN | 103973559 A | 8/2014 |
| CN | 105743386 A | 7/2016 |
| CN | 108574420 A | 9/2018 |

(Continued)

*Primary Examiner* — Rexford N Barnie
*Assistant Examiner* — Xuan Ly
(74) *Attorney, Agent, or Firm* — Conley Rose, P.C.

(57) ABSTRACT

A power conversion system includes a first controller, a system output end, at least one system input end, at least one power conversion component, and a bus communication apparatus coupled between each power conversion component and the first controller. Each system input end is in a one-to-one correspondence with each power conversion component. Each power conversion component is configured to convert an alternating current input through a first input end of each power conversion component into a direct current, and output the direct current through an output end of each power conversion component.

20 Claims, 13 Drawing Sheets

(56) References Cited

FOREIGN PATENT DOCUMENTS

| | | | |
|---|---|---|---|
| CN | 109361317 | * | 2/2019 |
| CN | 109361317 A | | 2/2019 |
| CN | 111211679 A | | 5/2020 |
| CN | 113452277 A | | 9/2021 |
| KR | 102181321 B1 | | 11/2020 |

* cited by examiner

POWER CONVERSION SYSTEM, POWER CONVERSION MODULE, AND PROCESSING APPARATUS

CROSS-REFERENCE TO RELATED APPLICATION

This application claims priority to Chinese Patent Application No. 202111294152.3, filed on Nov. 3, 2021, which is hereby incorporated by reference in its entirety.

TECHNICAL FIELD

This application relates to the field of electric power technologies, and in particular, to a power conversion system, a power conversion module, and a processing apparatus.

BACKGROUND

With the development of electronic power technologies, a solid-state transformer (SST) gradually enters a power system field. The SST may also be referred to as an electronic power transformer (EPT), and is a still electrical device combining an electronic power conversion technology with a high-frequency power conversion technology that is based on an electromagnetic induction principle to convert a power characteristic of electric energy.

The SST may serve a power grid scenario, to resolve a voltage disturbance problem of a power distribution network, for example, converting a medium voltage of 10 kilovolts (kV) into a low voltage of 400 volts (V). Generally, the SST includes a multi-phase branch, and circuit structures of all phases of branches may be the same. Each phase of branch may include a plurality of cascaded cells. Each cell includes an alternating-current/direct-current circuit and a direct-current/direct-current circuit. A medium voltage of 10 kV that is input from an input side of the SST may be equally divided by a plurality of cells. Each cell may convert a divided alternating current into a direct current. A cell controller is disposed in each cell, and can control an alternating-current/direct-current circuit and a direct-current/direct-current circuit in the cell. A centralized controller is disposed in the SST. The centralized controller exchanges a circuit parameter with each cell controller, so that the centralized controller implements overall control over a voltage conversion process.

In an existing SST, a centralized controller is connected to each cell controller by using an optical fiber. In this connection manner, although a communication delay is low, an external optical fiber interface needs to be configured for each cell, and therefore, communication costs are relatively high, and vulnerability of an optical fiber cable makes it difficult to insert/remove the cell.

SUMMARY

This application provides a power conversion system, a power conversion module, and a processing apparatus, so that costs are lower, and the power conversion module has relatively high insertion/removal flexibility and is not vulnerable to damage.

According to a first aspect, this application provides a power conversion system, including a first controller, a system output end, at least one system input end, at least one power conversion module, and a bus communication apparatus connected between each of the at least one power conversion module and the first controller. The at least one system input end is in a one-to-one correspondence with the at least one power conversion module. For example, one of the at least one system input end may be in a correspondence with one of the at least one power conversion module. One system input end corresponds to one power conversion module, and one power conversion module corresponds to one system input end. Each power conversion module may be configured to convert an alternating current input by a system input end corresponding to each power conversion module into a direct current, output the direct current to the system output end, and communicate with the first controller by using the bus communication apparatus connected between each power conversion module and the first controller.

In this embodiment of this application, each power conversion module communicates with the first controller by using the bus communication apparatus, and an optical fiber communication apparatus such as an optical fiber interface may not need to be disposed between the power conversion module and the first controller, so that costs are lower. In addition, each power conversion module and the bus communication apparatus have relatively high insertion/removal flexibility, and are not vulnerable to damage.

In some examples, the bus communication apparatus between each power conversion module and the first controller may include a first bus interface disposed on the first controller, a second bus interface disposed on each power conversion module, and a bus connected between the first bus interface and the second bus interface.

In a possible design, each power conversion module may include a first input end. In some scenarios, the first input end may be a system input end corresponding to the power conversion module. Alternatively, the first input end of the power conversion module and a corresponding system input end are a same physical port. In some other scenarios, the first input end of the power conversion module and the system input end corresponding to the power conversion module are separately two physical ports. In addition, the first input end may be connected to the system input end corresponding to the power conversion module.

In a possible design, the power conversion system includes a plurality of power conversion modules. The plurality of power conversion modules are cascaded, so that the power conversion system is applied to a scenario in which a medium voltage is converted into a low voltage. For example, each power conversion module may include a first input end, a second input end, and an output end. The first input end of each power conversion module is connected to a corresponding system input end, second input ends of the plurality of power conversion modules are connected to each other, and the output end of each power conversion module is connected to the system output end. In some scenarios, the output end of each power conversion module and the system output end may be a same physical port. In some other scenarios, the output end of each power conversion module and the system output end are two physical ports.

In a possible design, each power conversion module includes a second controller, at least one processing apparatus, and an optical fiber communication apparatus connected between each of the at least one processing apparatus and the second controller. Each processing apparatus is configured to convert an alternating current into a direct current, output the direct current to an output end of the processing apparatus, and communicate with the second controller by using the optical fiber communication apparatus connected between each processing apparatus and the second controller. The second controller is configured to communicate with the first controller by using a bus communication apparatus connected between each power conversion module and the first controller.

In this embodiment of this application, the power conversion module includes one or more processing apparatuses. The second controller in the power conversion module may communicate with the processing apparatus by using the optical fiber communication apparatus, to control the processing apparatus, so that the power conversion module is applied to a scenario of an excessively high insulation voltage. In addition, the second controller in the power conversion module communicates with the first controller by using the bus communication apparatus, so that the first controller controls, adjusts, or schedules power conversion in the power conversion system. It can be learned that the power conversion module has no external optical fiber communication interface, and has higher insertion/removal flexibly, and in addition, costs are relatively low.

In some examples, the optical fiber communication apparatus in each power conversion module includes a first optical fiber transceiver disposed on the second controller, a second optical fiber transceiver disposed on the processing apparatus, and an optical fiber connected between the first optical fiber transceiver and the second optical fiber transceiver.

In some examples, each power conversion module may further include a voltage processing circuit. The voltage processing circuit is connected to the output end of each processing apparatus, and is configured to perform, under the control of the second controller, voltage conversion processing on a voltage output by each processing apparatus.

In a possible design, each power conversion module may include a first input end and a second input end. Each processing apparatus includes a third input end and a fourth input end. Each power conversion module may include a plurality of processing apparatuses. For example, each power conversion module includes a processing apparatus 1, a processing apparatus i . . . a processing apparatus n, where i is any positive integer from 2 to n−1, and n is a positive integer greater than or equal to 2. A third input end of the processing apparatus 1 is connected to the first input end of the power conversion module, a third input end of the processing apparatus i is connected to a fourth input end of a processing apparatus i−1, a fourth input end of the processing apparatus i is connected to a third input end of a processing apparatus i+1, and a fourth input end of the processing apparatus n is connected to the second input end of the power conversion module. In this embodiment of this application, the power conversion module may include a plurality of processing apparatuses, and the plurality of processing apparatuses may be connected in series. Each processing apparatus may divide a voltage, and convert alternating-current electric energy of a divided voltage into direct-current electric energy. In this way, the plurality of processing apparatuses jointly convert alternating-current electric energy received by the first input end of the power conversion module into direct-current electric energy.

In a possible design, each power conversion module may include a first input end and a second input end. Each power conversion module includes one processing apparatus, a third input end of the processing apparatus is connected to the first input end of the power conversion module, and a fourth input end of the processing apparatus is connected to the second input end of the power conversion module. In this embodiment of this application, one processing apparatus included in the power conversion module may convert alternating-current electric energy received by the first input end of the power conversion module into direct-current electric energy.

In a possible design, each processing apparatus includes a third controller and at least one power converter. Each of the at least one power converter is configured to convert a received alternating current into a direct current under the control of the third controller, and then output the direct current to an output end of the power converter. The third controller is configured to control each power converter, and communicate with the second controller by using the optical fiber communication apparatus connected between each processing apparatus and the second controller.

In this embodiment of this application, the third controller in the processing apparatus may control one or more power converters, so that a quantity of third controllers in the power conversion system can be reduced, and a quantity of optical fiber communication apparatuses in the power conversion system that are used for communication between the second controller and the third controller can be reduced.

In a possible design, each power converter includes a fifth input end and a sixth input end. Each processing apparatus includes a power converter 1, a power converter j, and a power converter m, where j is any positive integer from 2 to m−1, and m is a quantity of the plurality of power converters. A fifth input end of the power converter 1 is the third input end of the processing apparatus, a fifth input end of the power converter j is connected to a sixth input end of a power converter j−1, a sixth input end of the power converter j is connected to a fifth input end of a power converter j+1, and a sixth input end of the power converter m is the fourth input end of the processing apparatus. In this embodiment of this application, the processing apparatus may include a plurality of power converters. The plurality of power converters may be connected in series, and each power converter may convert alternating-current electric energy into direct-current electric energy. The plurality of power converters may jointly convert alternating-current electric energy of a voltage divided by the processing apparatus into direct-current electric energy.

In a possible design, each power converter includes a fifth input end and a sixth input end. Each processing apparatus includes one power converter, a fifth input end of the power converter is connected to the third input end of the processing apparatus, and a sixth input end of the power converter is the fourth output end of the processing apparatus. In this embodiment of this application, the processing apparatus may include one power converter, and alternating-current electric energy of a voltage divided by the processing apparatus may be converted into direct-current electric energy.

In a possible design, each power converter includes an alternating-current/direct-current conversion circuit and a direct-current/direct-current conversion circuit. A first end of the alternating-current/direct-current conversion circuit is the fifth input end of each power converter, a second end of the alternating-current/direct-current conversion circuit is the sixth input end of each power converter, and a third end of the alternating-current/direct-current conversion circuit is connected to an input end of the direct-current/direct-current conversion circuit by using a bus. An output end of the direct-current/direct-current conversion circuit is connected to the voltage processing circuit.

In a possible design, each processing apparatus includes a plurality of power converters. Each processing apparatus further includes a power supply system, and the power supply system is configured to obtain electric energy from at least two power converters in each processing apparatus, and supply power to the third controller in each processing apparatus. In such a design, when a power supply circuit is faulty, it can be ensured that the third controller can still work, so that reliability of the power conversion system is improved. In some examples, the power supply system includes at least two power supply circuits. The at least two power supply circuits are in a one-to-one correspondence with the at least two power converters. An input end of each of the at least two power supply circuits is connected to a corresponding power converter. An output end of each power supply circuit is connected to an output end of the power supply system. The output end of the power supply system is connected to the third controller in each processing apparatus.

In some examples, a power supply branch may obtain electric energy from the power converter, for example, an input end of each power supply branch is connected to a bus between an alternating-current/direct-current conversion circuit and a direct-current/direct-current conversion circuit in a corresponding power converter, or an input end of each power supply branch is connected to an output end of a direct-current/direct-current conversion circuit in a corresponding power converter.

According to a second aspect, this application further provides a power conversion module. The power conversion module may be applied to a power conversion system, and the power conversion system includes a first controller. The power conversion module includes a second controller, at least one processing apparatus, and an optical fiber communication apparatus connected between each of the at least one processing apparatus and the second controller. Each processing apparatus is configured to convert an alternating current into a direct current, output the direct current to an output end of the processing apparatus, and communicate with the second controller by using the optical fiber communication apparatus connected between each processing apparatus and the second controller. The second controller is configured to communicate with the first controller by using a bus communication apparatus connected between each power conversion module and the first controller.

In this embodiment of this application, the power conversion module may communicate with the first controller in the power conversion system by using the bus communication apparatus, and an optical fiber communication apparatus such as an optical fiber interface may not need to be disposed between the power conversion module and the first controller, so that costs are lower. In addition, each power conversion module and the bus communication apparatus have relatively high insertion/removal flexibility, and are not vulnerable to damage.

In a possible design, the power conversion module may further include a voltage processing circuit. The voltage processing circuit is connected to the output end of each processing apparatus, and is configured to perform, under the control of the second controller, voltage conversion processing on a voltage output by each processing apparatus, and output electric energy obtained after the voltage conversion processing.

According to a third aspect, this application further provides a processing apparatus. The processing apparatus may be applied to a power conversion module, and the power conversion module includes a second controller. The processing apparatus includes a third controller and a plurality of power converters. Each of the plurality of power converters is configured to convert a received alternating current into a direct current under the control of the third controller, and then output the direct current to an output end of the power converter. The third controller is configured to control each power converter, and communicate with the second controller by using an optical fiber communication apparatus connected between each processing apparatus and the second controller.

In this embodiment of this application, the third controller in the processing apparatus may control the plurality of power converters, so that a quantity of third controllers in the power conversion module can be reduced, and a quantity of optical fiber communication apparatuses in the power conversion module that are used for communication between the second controller and the third controller can be reduced. In this way, the second controller controls power conversion by using the third controller, so that the processing apparatus can be applied to a scenario of an excessively high insulation voltage.

In a possible design, each processing apparatus further includes a power supply system, and the power supply system is configured to obtain electric energy from at least two power converters in each processing apparatus, and supply power to the third controller in each processing apparatus. In such a design, when a power supply circuit is faulty, it can be ensured that the third controller can still work, so that reliability of a power conversion system is improved.

In some examples, the power supply system includes at least two power supply circuits. The at least two power supply circuits are in a one-to-one correspondence with the at least two power converters. An input end of each of the at least two power supply circuits is connected to a corresponding power converter. An output end of each power supply circuit is connected to an output end of the power supply system. The output end of the power supply system is connected to the third controller in each processing apparatus.

In some examples, a power supply branch may obtain electric energy from the power converter, for example, an input end of each power supply branch is connected to a bus between an alternating-current/direct-current conversion circuit and a direct-current/direct-current conversion circuit in a corresponding power converter, or an input end of each power supply branch is connected to an output end of a direct-current/direct-current conversion circuit in a corresponding power converter.

DESCRIPTION OF EMBODIMENTS

Terms used in the following embodiments are merely intended to describe embodiments, but are not intended to limit this application. As used in the specification and appended claims of this application, singular expressions "an", "a", "the", "above", "the", and "this" are intended to include such an expression like "one or more", unless the contrary is clearly indicated in a context.

Reference to "one embodiment", "some embodiments", or the like described in this specification means that a specific characteristic, structure, or feature described with reference to the embodiment is included in one or more embodiments of this application. Therefore, statements such as "in one embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner. A "one-to-one correspondence" between at least one A and at least one B described in this specification, or that at least one A and at least one B are in a "one-to-one correspondence" relationship may mean that one A in the at least one A and one B in the at least one B are in a correspondence. One A corresponds to only one B, and one B corresponds to only one A. A and B may be components in a power conversion system provided in this application.

To make objectives, technical solutions, and advantages of this application clearer, the following further describes this application in detail with reference to the accompanying drawings. For ease of understanding of advantages of a power conversion system provided in embodiments of this application, an application scenario of the power conversion system is described below first.

Figure 1A:
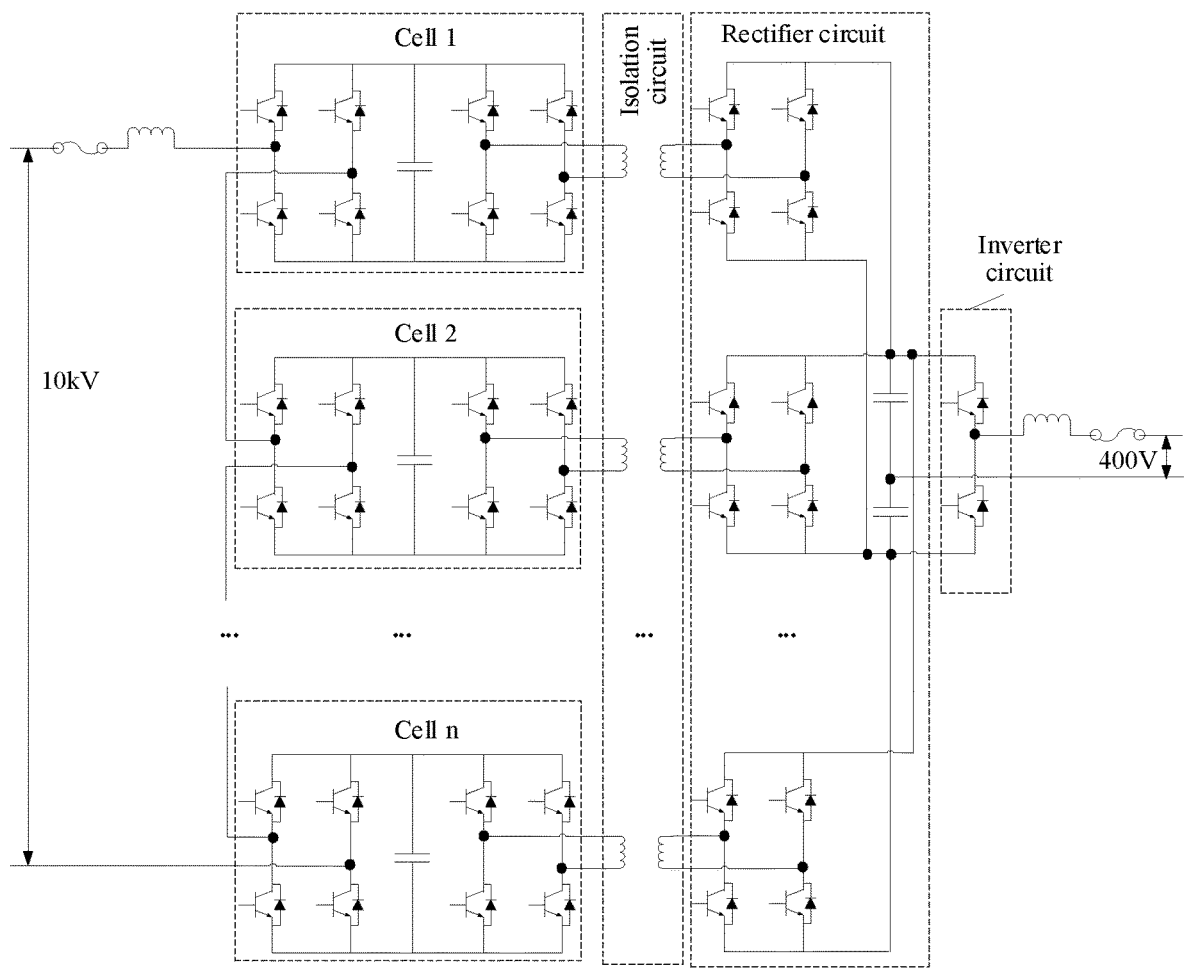
FIG. 1A is a schematic diagram of a topology structure of an SST.

An SST may serve a power system. Compared with a conventional transformer, the SST has many advantages, such as flexible control over a primary-side current, a secondary-side voltage, and power. When the SST is applied to the power system, electric energy quality can be improved, system stability can be improved, and a flexible power transmission manner and real-time control over a power flow can be implemented. The SST can be applied not only to the new-energy intelligent microgrid field, but also to a conventional power grid, such as a medium-to-low-voltage conversion scenario. FIG. 1A shows a topology structure of an SST applied to a power grid scenario. Circuit structures of all phases of branches in the SST are the same. Each phase of branch may include a plurality of cascaded cells (also referred to as units), an isolation circuit, a rectifier circuit, and an inverter circuit. Each cell includes one alternating-current/direct-current circuit and one direct-current/direct-current circuit. The isolation circuit includes a plurality of isolation sub-circuits. The rectifier circuit includes a plurality of rectifier sub-circuits connected in parallel. A medium voltage of 10 kV that is input from an input side of the SST may be equally divided by a plurality of cells. Each cell is connected to a corresponding rectifier sub-circuit by using a corresponding isolation sub-circuit. Output sides of the plurality of rectifier sub-circuits are connected in parallel and then connected to the inverter circuit. The inverter circuit may output a low voltage of 400 V.

Figure 1B:
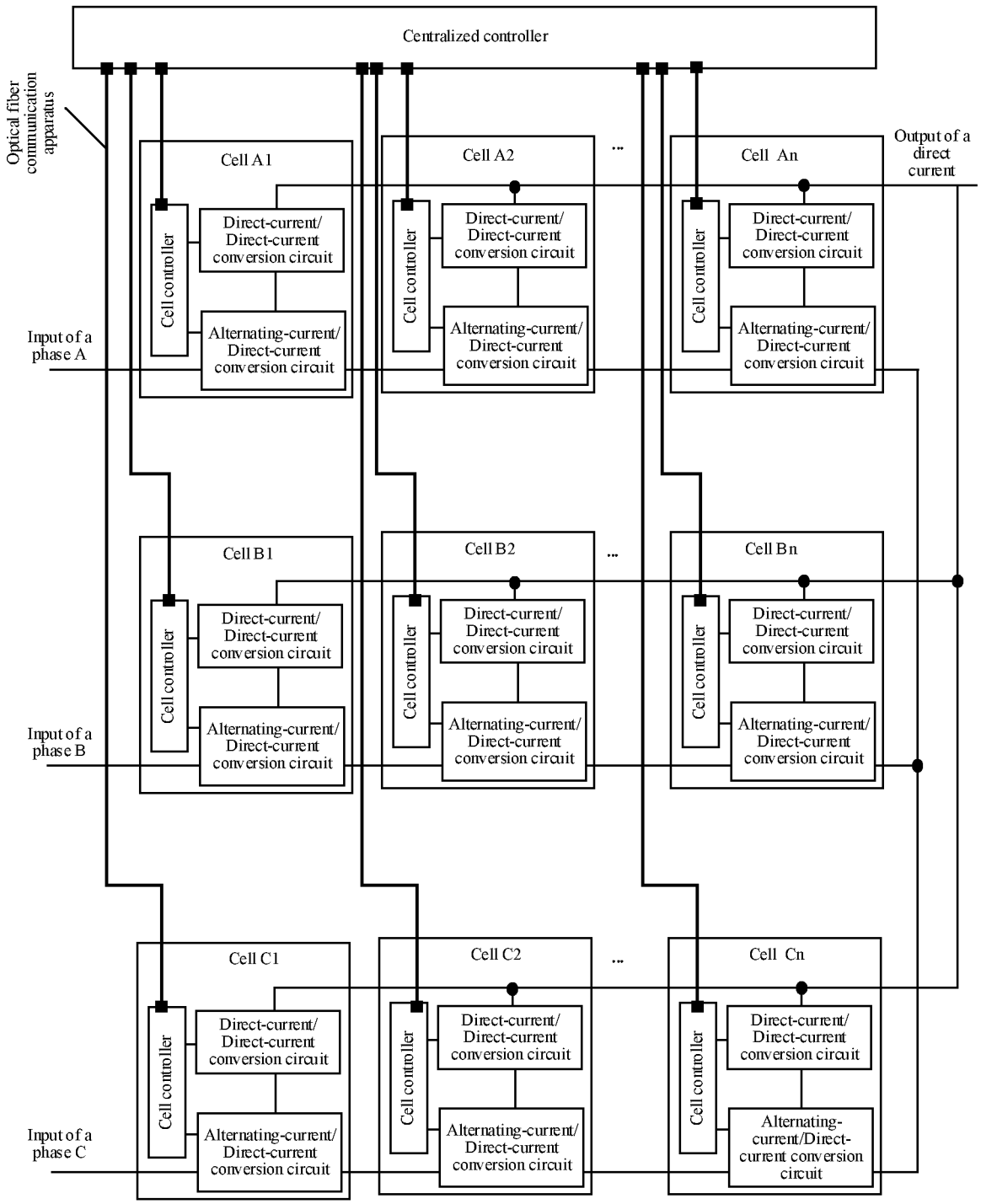
FIG. 1B is a schematic diagram of a connection relationship between controllers in an SST.

FIG. 1B shows a connection relationship between controllers in the topology structure of the SST. A cell controller is disposed in each cell, and can control an alternating-current/direct-current circuit and a direct-current/direct-current circuit in the cell. A centralized controller is disposed in the SST. The centralized controller exchanges a circuit parameter with each cell controller, so that the centralized controller implements overall control. If there is an alternating-current power grid voltage of 10 kV at the input side of the SST, an output side of the SST needs to be insulated from the input side at 10 kV. An excessively high insulation voltage makes it difficult to perform communication between input and output by using an electrical signal. Therefore, in a topology of the SST, each cell is connected to the centralized controller by using an optical fiber, and performs communication by using an optical signal. Consequently, not only costs of communication between the centralized controller and the cell controller are relatively high, but vulnerability of the optical fiber cable also makes it difficult to insert/remove the cell.

Figure 2A:
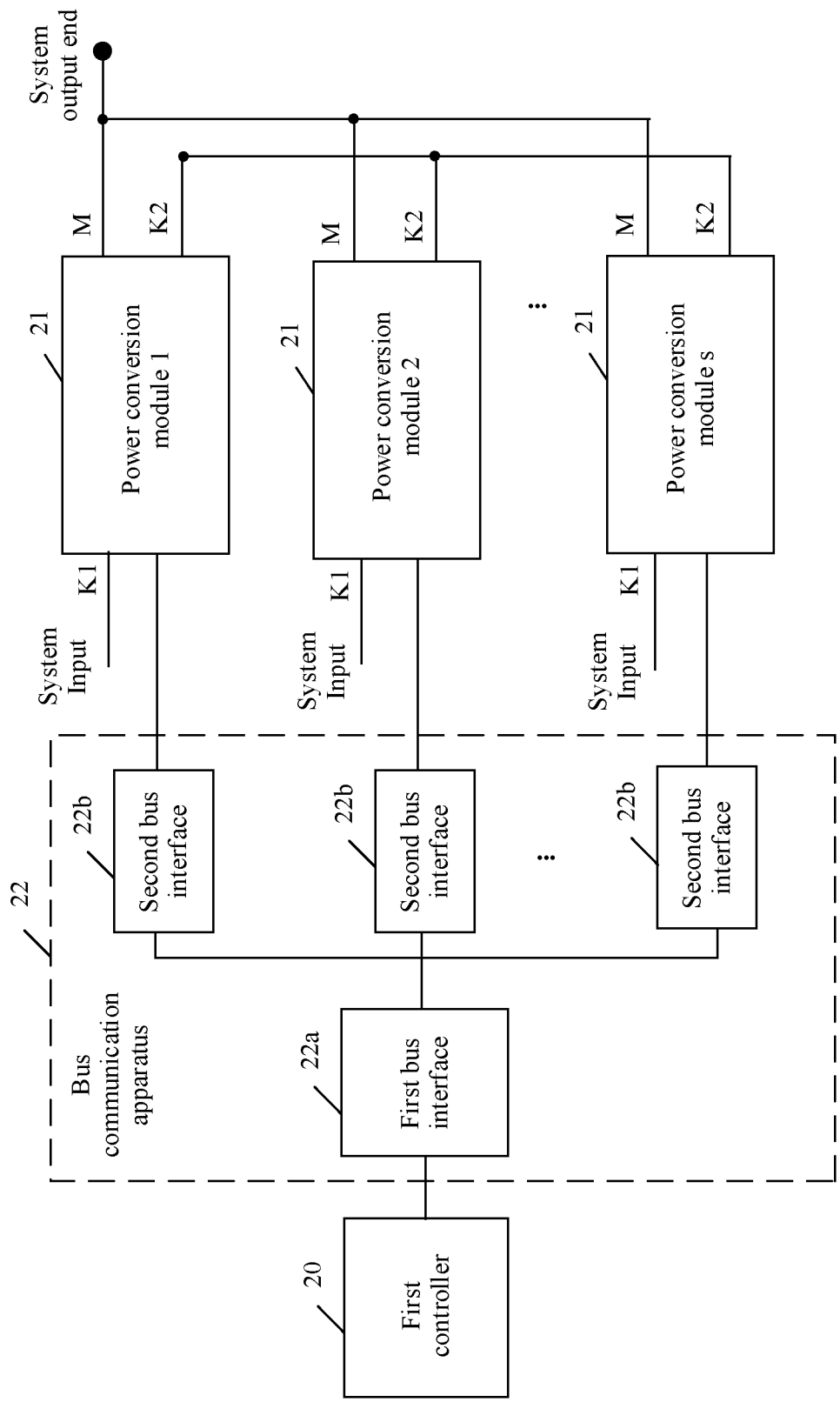
FIG. 2A is a schematic diagram of a structure of a power conversion system.

In view of this, this application provides a power conversion system with relatively low costs, and modules in the system have relatively high insertion/removal flexibility. Referring to FIG. 2A, the power conversion system may include a first controller 20, at least one power conversion module (21), and a bus communication apparatus (22) connected between the first controller (20) and each power conversion module (21). The first controller (20) may communicate with each power conversion module (21) by using the bus communication apparatus (22), to control each power conversion module (21), for example, control or adjust an operating status of each power conversion module (21), such as an output voltage.

Compared with the topology structure of the SST shown in FIG. 1B, the power conversion module (21) in the power conversion system provided in this application may implement power conversion functions of one or more cells in one phase of branch in the topology structure of the SST shown in FIG. 1B, that is, convert an alternating current input to one phase of branch into a direct current. For example, the power conversion module (21) may include but is not limited to the foregoing one or more cells. To enable the module in the system to have relatively high insertion/removal flexibility, each power conversion module (21) may communicate with the first controller (20) by using the bus communication apparatus (22), and the power conversion module (21) may further include a controller (which may be denoted as a second controller for ease of distinguishing) that communicates with the first controller (20) by using the bus communication apparatus (22). The second controller may communicate with the first controller (20) by using the bus communication apparatus (22), and exchange data (such as a control parameter), so that the first controller (20) controls each power conversion module (21). The second controller may control each cell in the power conversion module (21), or may communicate with a cell controller in each cell. The power conversion module (21) provided in this application is described in detail below.

In a possible design, as shown in FIG. 2A, the power conversion system includes one bus communication apparatus (22). The bus communication apparatus (22) is connected to each power conversion module (21) and the first controller (20). The bus communication apparatus (22) may include one first bus interface (22a), at least one second bus interface (22b), and a bus. The at least one power conversion module (21) may be in a one-to-one correspondence with the at least one second bus interface (22b).

Each power conversion module (21) is connected to a corresponding second bus interface (22b). The first controller (20) is connected to the first bus interface (22a). Each second bus interface (22b) is connected to the first bus interface (22a) by using a bus. In some scenarios, a second bus interface that is in the bus communication apparatus (22) and that is corresponding to the power conversion module (21) may be disposed on the power conversion module (21) or integrated into the power conversion module (21).

Figure 2B:
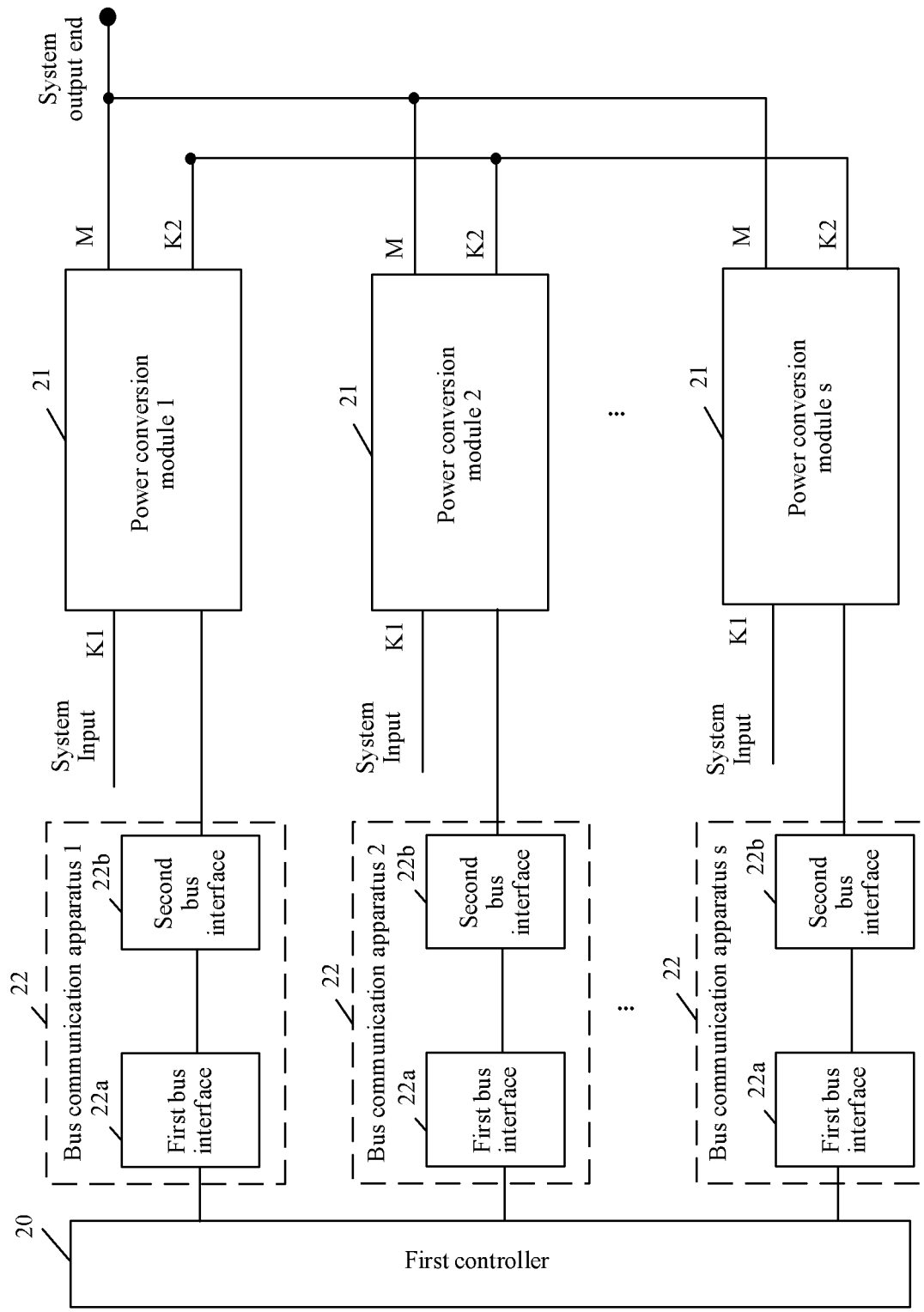
FIG. 2B is a schematic diagram of a structure of a power conversion system.

In another possible design, as shown in FIG. 2B, the power conversion system includes at least one bus communication apparatus (22). The at least one bus communication apparatus (22) is in a one-to-one correspondence with the at least one power conversion module (21). The power conversion module (21) may be connected to a corresponding bus communication apparatus (22). Each bus communication apparatus (22) may include a first bus interface (22a), a second bus interface (22b), and a bus connected between the first bus interface (22a) and the second bus interface (22b). The first bus interface (22a) is connected to the first controller (20), and the second bus interface (22b) is connected to a corresponding power conversion module 21. In some scenarios, a second bus interface that is in the bus communication apparatus (22) and that is corresponding to the power conversion module (21) may be disposed on the power conversion module (21) or integrated into the power conversion module (21).

Each power conversion module (21) communicates with the first controller (20) by using the bus communication apparatus (22), and an optical fiber communication apparatus (such as an optical fiber interface) may not need to be disposed between the power conversion module (21) and the first controller (20), so that costs are lower. In addition, each power conversion module (21) and the bus communication apparatus (22) have relatively high insertion/removal flexibility, and are not vulnerable to damage. In this application, the power conversion module (21) may also be referred to as a power conversion module. The power conversion module (21) may include a component that implements power conversion, or may include a structure such as a housing configured to package or accommodate the component, so that the power conversion module (21) is connected to the power conversion system or is separated from the power conversion system.

The power conversion system may include one or more power conversion modules (21). When the power conversion system includes one power conversion module (21), an input end of the power conversion module (21) is connected to a system input end of the power conversion system. An output end of the power conversion module (21) may be connected to an output end of the power conversion system. The output end of the power conversion system may be connected to a load. The power conversion module (21) may perform power conversion, for example, convert an alternating current into a direct current. The power conversion module 21 may convert a single-phase alternating current into a direct current.

When the power conversion system includes a plurality of power conversion modules (21), as shown in FIG. 2A or FIG. 2B, the power conversion system may include a plurality of system input ends. The plurality of system input ends may be in a one-to-one correspondence with the plurality of power conversion modules (21), and a first input end (K1) of each power conversion module (21) may be connected to a corresponding system input end. Second input ends (K2) of the plurality of power conversion modules (21) are connected to each other, so that the plurality of power conversion modules (21) can be cascaded. An output end (M) of each power conversion module (21) is connected to a system output end. Each power conversion module (21) may convert an alternating current input through the first input end (K1) of the power conversion module (21) into a direct current, and output the direct current through the output end (M) of the power conversion module (21).

In some possible scenarios, the system input end of the power conversion system may be connected to a power grid, and the system output end is connected to the load. The power grid may supply a power grid voltage to the power conversion system, and the power conversion system may output a utilization voltage to the load. Generally, the power grid voltage is higher than a load voltage, and the power conversion system may have a voltage step-down function. In some examples, the power grid voltage may be a medium voltage, and the load voltage may be a low voltage. Optionally, the medium voltage may be 10 kV, and the low voltage may be 400 V.

Figure 3:
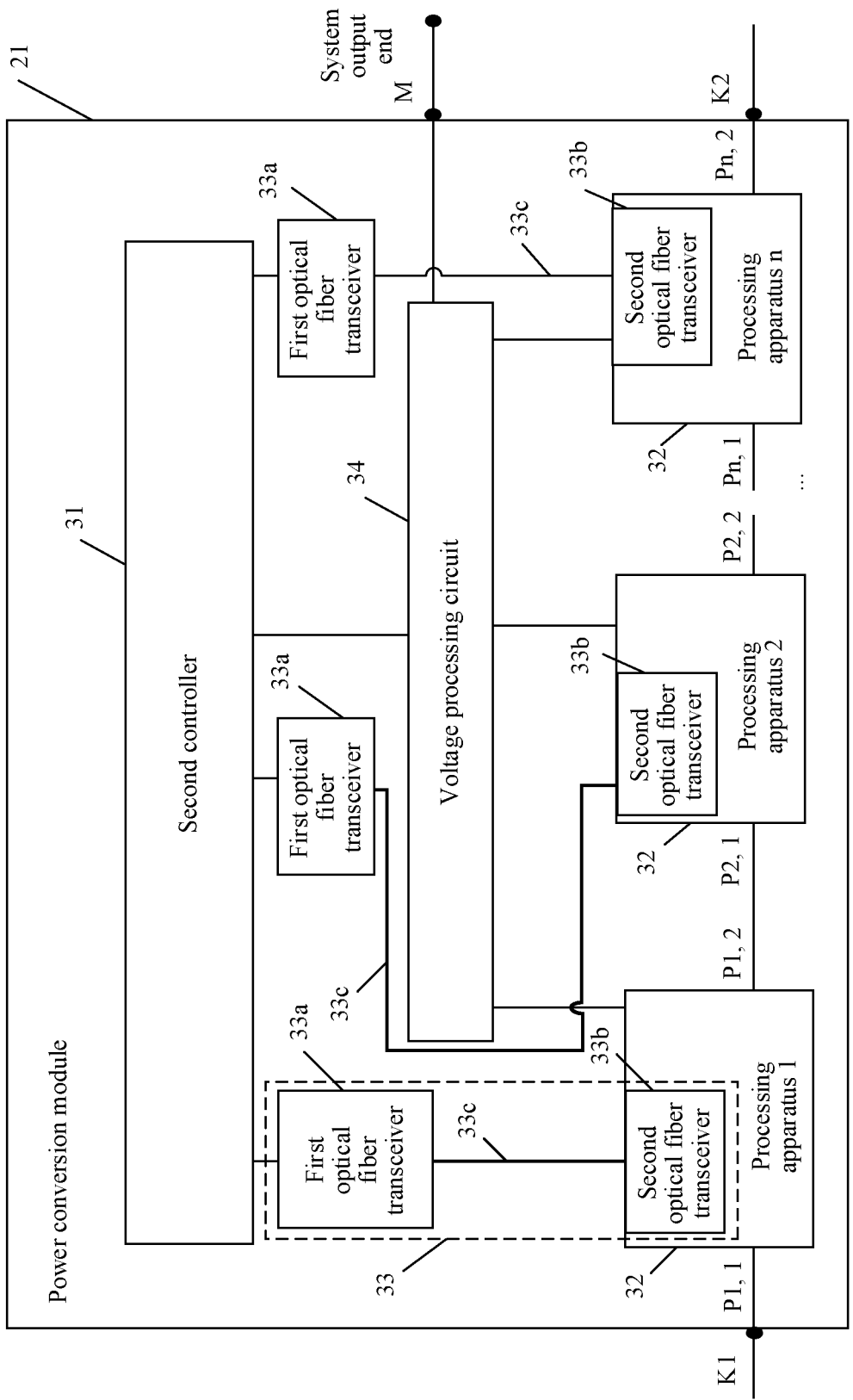
FIG. 3 is a schematic diagram of a structure of a power conversion module.

The voltage step-down function of the power conversion system may be jointly implemented by one or more power conversion modules (21). This application further provides a power conversion module (21), as shown in FIG. 3. The power conversion module (21) may include a second controller (31), at least one processing apparatus (32), and an optical fiber communication apparatus (33) connected between each of the at least one processing apparatus (32) and the second controller (31).

The at least one processing apparatus (32) in the power conversion module (21) may jointly implement a function in which the power conversion module (21) converts an alternating current input from a corresponding system input end into a direct current and then outputs the direct current to the system output end. The at least one processing apparatus (32) is a plurality of processing apparatuses (32), and the plurality of processing apparatuses (32) may be connected in series. Each processing apparatus (32) may convert a divided alternating current into a direct current, so that the plurality of processing apparatuses (32) jointly implement a function in which the power conversion module (21) converts an alternating current input from a corresponding system input end into a direct current. In some scenarios, the processing apparatus (32) may be a cell in a phase of branch in the topology structure of the SST shown in FIG. 1B, in other words, the processing apparatus (32) may include a cell controller, one alternating-current/direct-current circuit, and one direct-current/direct-current circuit. The cell controller in the processing apparatus (32) may communicate with the second controller (31) by using the optical fiber communication apparatus (33). In some other scenarios, the processing apparatus (32) may include but is not limited to the foregoing cell, for example, includes a cell controller, a plurality of alternating-current/direct-current circuits, and a plurality of direct-current/direct-current circuits. The processing apparatus (32) provided in this application is described in detail below.

Each processing apparatus (32) may convert a received alternating current into a direct current, and output the direct current through an output end of the processing apparatus (32). Each processing apparatus (32) communicates with the second controller (31) by using the optical fiber communication apparatus (33) connected between the processing apparatus (32) and the second controller (31), so that the second controller (31) controls each processing apparatus (32), for example, controls or adjusts an operating status of each processing apparatus (32), such as an output voltage. As shown in FIG. 3, at least one processing apparatus (32) may be in a one-to-one correspondence with the optical fiber communication apparatus (33) in the power conversion module (21). In the power conversion module (21), each optical fiber communication apparatus (33) may include a first optical fiber transceiver (33a), a second optical fiber transceiver (33b), and an optical fiber (33c) connected between the first optical fiber transceiver (33a) and the second optical fiber transceiver (33b). Each first optical fiber transceiver (33a) is connected to the second controller (31), and the second optical fiber transceiver (33b) may be connected to a corresponding processing apparatus (32), or the second optical fiber transceiver (33b) may be disposed in a corresponding processing apparatus (32) (as shown in FIG. 3) or integrated into a corresponding processing apparatus (32). In other words, the processing apparatus (32) may include the second optical fiber transceiver (33b). The processing apparatus (32) in the power conversion module (21) may communicate with the second controller (31) by using the optical fiber, so that the power conversion module (21) is applied to a scenario of an excessively high insulation voltage.

The power conversion module (21) may include a voltage processing circuit (34). The voltage processing circuit (34) is connected to the output end of each processing apparatus (32). The second controller (31) may control the voltage processing circuit (34), for example, control the voltage processing circuit (34) to work. The voltage processing circuit (34) may perform, under the control of the second controller (31), voltage conversion processing on a voltage output by each processing apparatus (32).

In a possible design, the power conversion module (21) may include a plurality of processing apparatuses (32), that is, n processing apparatuses (32), where n may represent a quantity of processing apparatuses (32) in the power conversion module (21), and n≥2. For ease of description, an $i^{th}$ processing apparatus in the n processing apparatuses (32) is denoted as a processing apparatus i. Each processing apparatus (32) has a third input end (Pi, 1) and a fourth input end (Pi, 2).

The n processing apparatuses (32) may be connected in series. A third input end (P1, 1) of a processing apparatus 1 is connected to the first input end (K1) of the power conversion module (21). A third input end (Pi, 1) of the processing apparatus i is connected to a fourth input end (Pi−1, 2) of a processing apparatus i−1. A fourth input end (Pi, 2) of the processing apparatus i (2≤i≤n−1) is connected to a third input end (Pi+1, 1) of a processing apparatus i+1. For example, when i is equal to 2, a third input end (P2, 1) of a processing apparatus 2 is connected to a fourth input end (P1, 2) of the processing apparatus 1, and a fourth input end (P2, 2) of the processing apparatus 2 is connected to a third input end (P3, 1) of a processing apparatus 3. A third input end (Pn, 1) of a processing apparatus n is connected to a fourth input end (Pn−1, 2) of a processing apparatus n−1, and a fourth input end (Pn, 2) of the processing apparatus n is the second input end (K2) of the power conversion module.

Figure 4A:
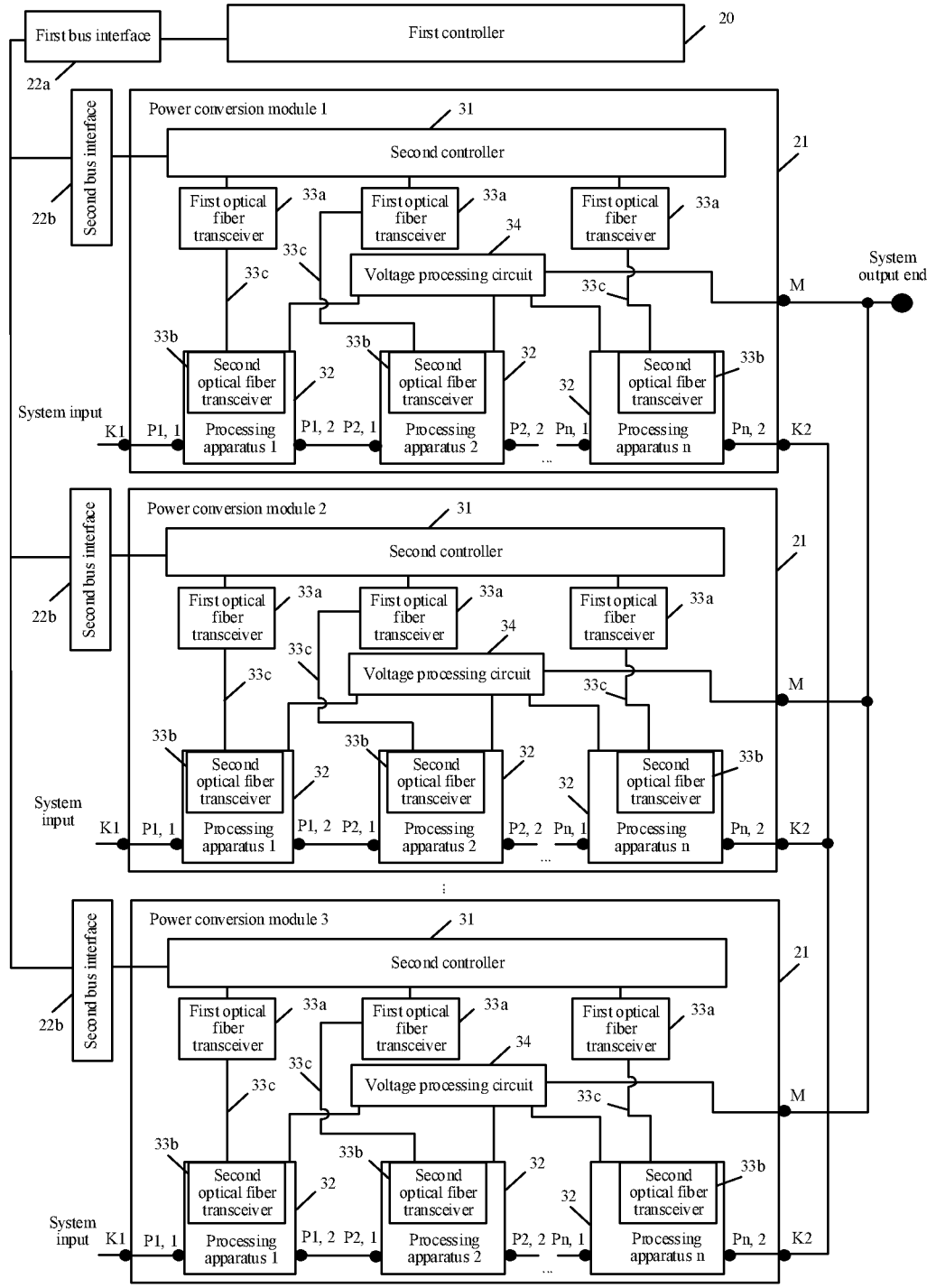
FIG. 4A is a schematic diagram of a structure of a power conversion system.
Figure 4B:
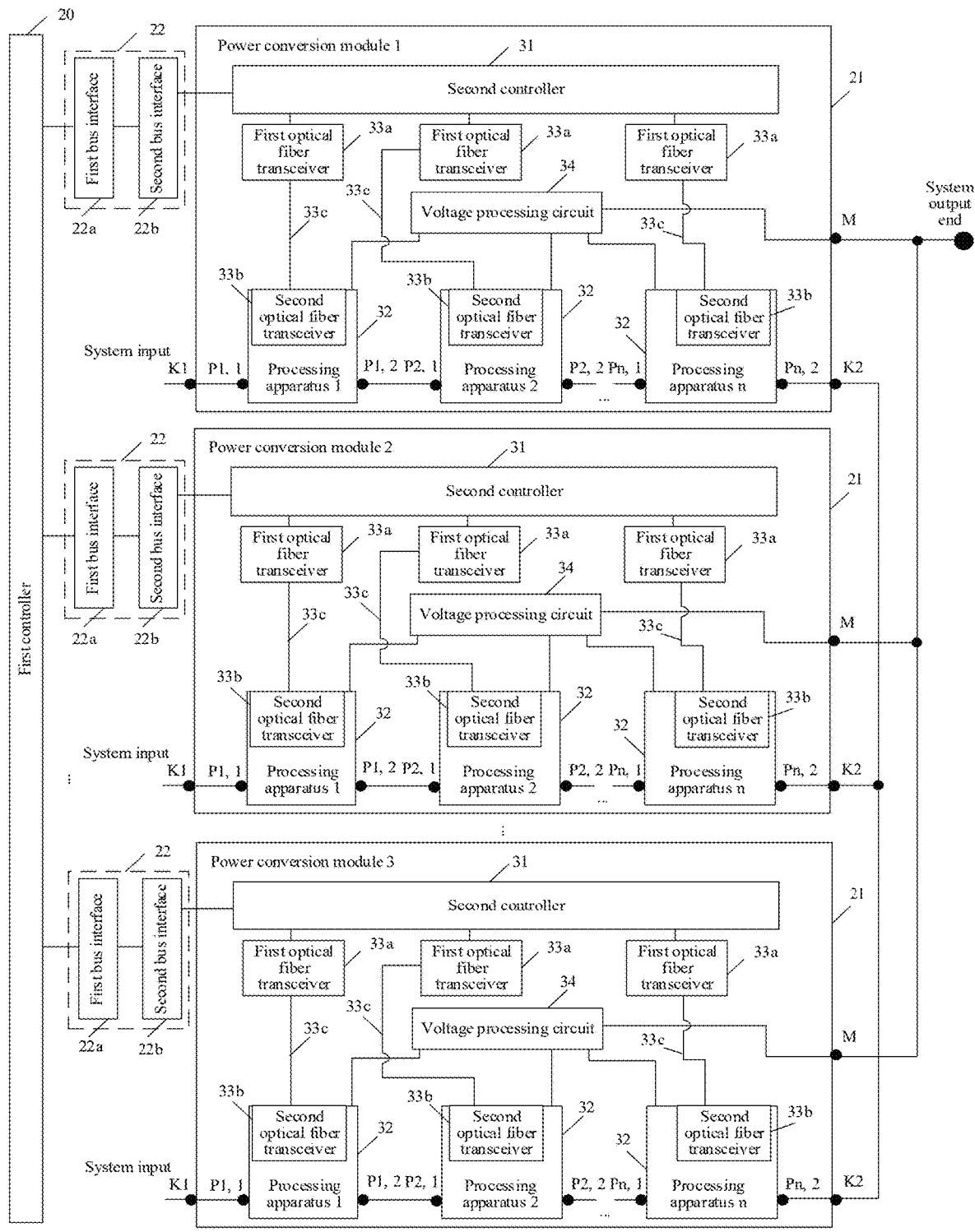
FIG. 4B is a schematic diagram of a structure of a power conversion system.

Based on the foregoing structure of the processing apparatus (32), for a schematic diagram of a structure in which the power conversion system includes a plurality of power conversion modules (21), refer to FIG. 4A and FIG. 4B. The second controller (31) in each power conversion module (21) may communicate with the first controller (20) by using a bus communication apparatus (22) or a second bus interface (22b) corresponding to the power conversion module (21). As shown in FIG. 4A, the power conversion system includes one bus communication apparatus (22). The bus communication apparatus (22) includes one first bus interface (22a), a plurality of second bus conversion interfaces (22b), and a bus connected between the second bus conversion interface (22b) and the first bus interface (22a). Each power conversion module (21) may perform bus communication with the first controller (20) by using a corresponding second bus interface (22b). It can be learned that each power conversion module (21) does not need to communicate with the first controller (20) by using an optical fiber communication apparatus externally. Each power conversion module (21) may include an optical fiber communication apparatus (33). The optical fiber communication apparatus (33) in the power conversion module (21) may be used for communication between the processing apparatus (32) and the second controller (31), so that the processing apparatus (32) and the second controller (31) can communicate with each other in a scenario of an excessively high insulation voltage.

As shown in FIG. 4B, the power conversion system includes a plurality of bus communication apparatuses (22). The bus communication apparatus (22) includes one first bus interface (22a), a second bus conversion interface (22b), and a bus connected between the second bus conversion interface (22b) and the first bus interface (22a). Each power conversion module (21) may perform bus communication with the first controller (20) by using a second bus interface (22b) in a corresponding bus communication apparatus (22). Similarly, each power conversion module (21) does not need to communicate with the first controller (20) by using an optical fiber communication apparatus externally. Each power conversion module (21) may include an optical fiber communication apparatus (33). The optical fiber communication apparatus (33) in the power conversion module (21) may be used for communication between the processing apparatus (32) and the second controller (31), so that the processing apparatus (32) and the second controller (31) can communicate with each other in a scenario of an excessively high insulation voltage.

In another possible design, the power conversion module (21) may include one processing apparatus (32), such as a processing apparatus 1. A third input end (P1, 1) of the processing apparatus 1 is connected to the first input end (K1) of the power conversion module (21), and a fourth input end (P1, 2) of the processing apparatus 1 is connected to the second input end (K2) of the power conversion module (21).

Figure 5:
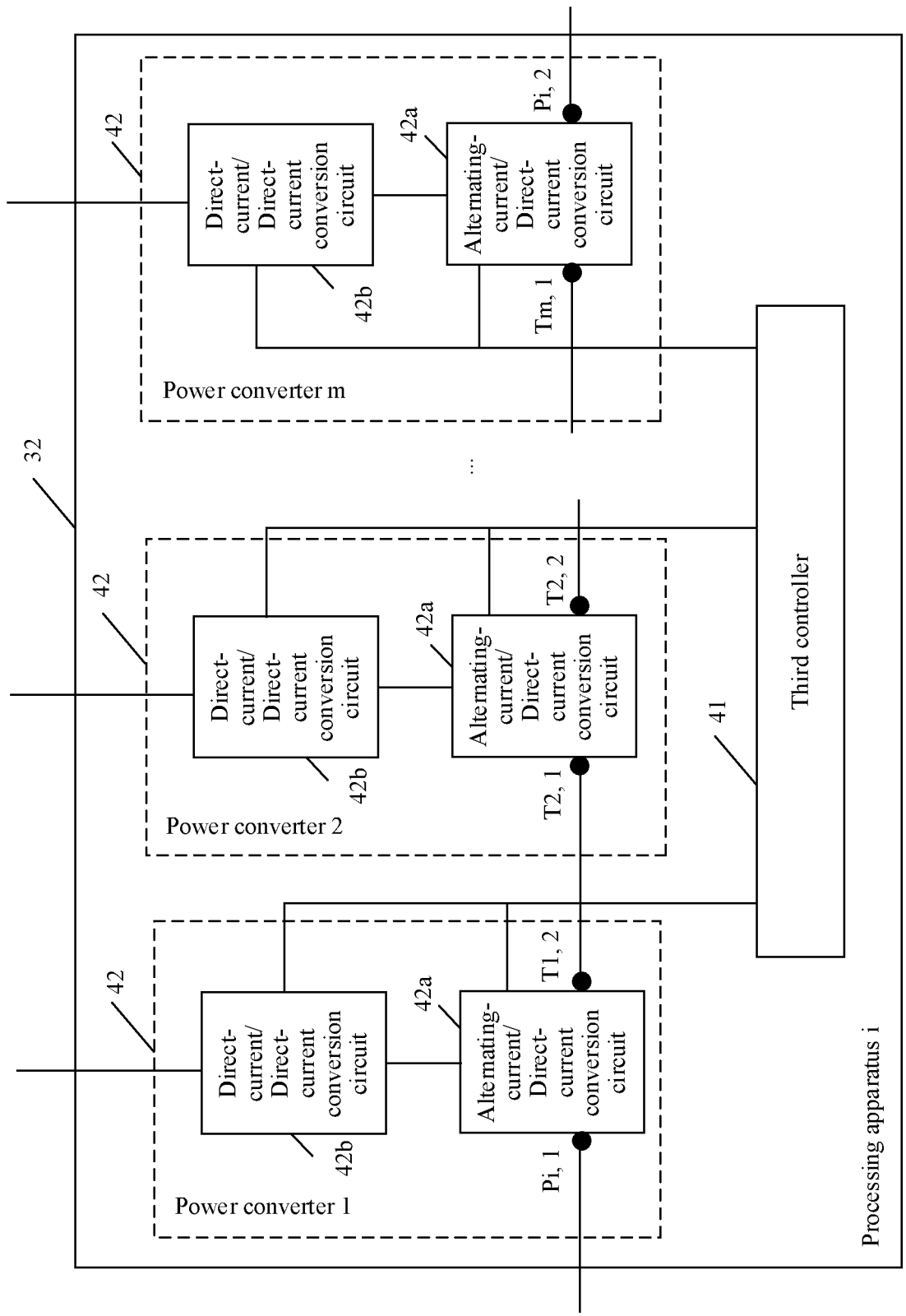
FIG. 5 is a schematic diagram of a structure of a processing apparatus.

This application further provides a processing apparatus (32). As shown in FIG. 5, the processing apparatus (32) may include a third controller (41) and at least one power converter (42). Each power converter (42) may convert a received alternating current into a direct current under the control of the third controller (41), and output the direct current through an output end of the power converter (42). The third controller (41) may control each power converter (42). The third controller (41) may be connected to the optical fiber communication apparatus (33) corresponding to the processing apparatus (32), to communicate with the second controller (31), or may enable the third controller (41) to communicate with the second controller (31) in a scenario of an excessively high insulation voltage.

In a possible design, the processing apparatus (32) may include a plurality of power converters, or may include m power converters, where m may represent a quantity of power converters (42) in the processing apparatus (32), and m≥2. For ease of description, a $j^{th}$ power converter in the plurality of power converters is denoted as a power converter j. The power converter j has a fifth input end (Tj, 1) and a sixth input end (Tj, 2). A fifth input end (Ti, 1) of a power converter 1 may be a third input end (Pj, 1) of the processing apparatus (32), or may be connected to a third input end (Pj, 1) of the processing apparatus (32). A sixth input end (Tm, 2) of a power converter m may be a fourth input end (Pj, 2) of the processing apparatus (32), or may be connected to a fourth input end (Pj, 2) of the processing apparatus (32).

In any processing apparatus, a plurality of power converters may be connected in series. A fifth input end (T1, 1) of a power converter 1 may be a third input end (Pi, 1) of a processing apparatus i, or may be connected to a third input end (Pi, 1) of the processing apparatus (32). A sixth input end (Tm, 2) of a power converter m may be a fourth input end (Pj, 2) of the processing apparatus (32), or may be connected to a fourth input end (Pi, 2) of the processing apparatus (32). For any power converter j (2≤j≤m−1), a fifth input end (Tj, 1) of the power converter j is connected to a sixth input end (Tj−1, 2) of a power converter j−1, and a sixth input end (Tj, 2) of the power converter j is connected to a fifth input end (Tj+1, 1) of a power converter j+1. A fifth input end (Tm, 1) of the power converter m is connected to a sixth input end (Tm−1, 2) of a power converter m−1.

In another possible design, the processing apparatus (32) includes one power converter, such as a power converter 1. A fifth input end (Ti, 1) of the power converter 1 may be a third input end (Pj, 1) of the processing apparatus (32), or may be connected to a third input end (Pj, 1) of the processing apparatus (32). A sixth input end (Tm, 2) of a power converter m may be a fourth input end (Pj, 2) of the processing apparatus (32), or may be connected to a fourth input end (Pj, 2) of the processing apparatus (32).

In the processing apparatus (32), the third controller (41) may control (or drive) each power converter (42). In some scenarios, an operating status parameter of each power converter (42) may be obtained, for example, a parameter such as a current or a voltage is obtained, to control or adjust the power converter (42). The third controller (41) may send the operating status parameter of each power converter (42) to the second controller (31) by using a corresponding optical fiber communication apparatus (33). The third controller (41) may also receive, by using the corresponding optical fiber communication apparatus (33), a signal sent by the second controller (31). The signal sent by the second controller (31) may enable the third controller (41) to adjust control over the power converter (42), or may enable the third controller (41) to obtain and report the operating status parameter of each power converter (42). It can be learned that a signal, information, or data exchanged between the second controller (31) and the third controller (41) may adjust a power conversion function of the power conversion module (21).

In some possible scenarios, the third controller (41) and the power converter (42) in the processing apparatus (32) may be integrated into a printed circuit board, so that space, in the power conversion system, occupied by the processing apparatus (32) can be reduced. In addition, one third controller (41) may control a plurality of power converters (42), so that a quantity of third controllers (41) in the power conversion system can be reduced, and a quantity of optical fiber communication apparatuses (33) in the power conversion system that are used for communication between the second controller (31) and the third controller (41) can be reduced.

Generally, each power converter (42) may include an alternating-current/direct-current conversion circuit (42a) and a direct-current/direct-current conversion circuit (42b). In each power converter (42), the alternating-current/direct-current conversion circuit (42a) may have two input ends (respectively a first end and a second end) and an output end (denoted as a third end). The first end of the alternating-current/direct-current conversion circuit (42a) is a fifth input end (Tj, 1) of each power converter (42), the second end of the alternating-current/direct-current conversion circuit (42a) is a sixth input end (Tj, 2) of each power converter (42), and the third end of the alternating-current/direct-current conversion circuit (42a) is connected to an input end of the direct-current/direct-current conversion circuit (42b) by using a bus. An output end of the direct-current/direct-current conversion circuit (42b) may also be the output end of the power converter (42). An output end of each power converter (42) in the processing apparatus (32) may be connected to the voltage processing circuit (34) in the power conversion module (21).

Figure 6A:
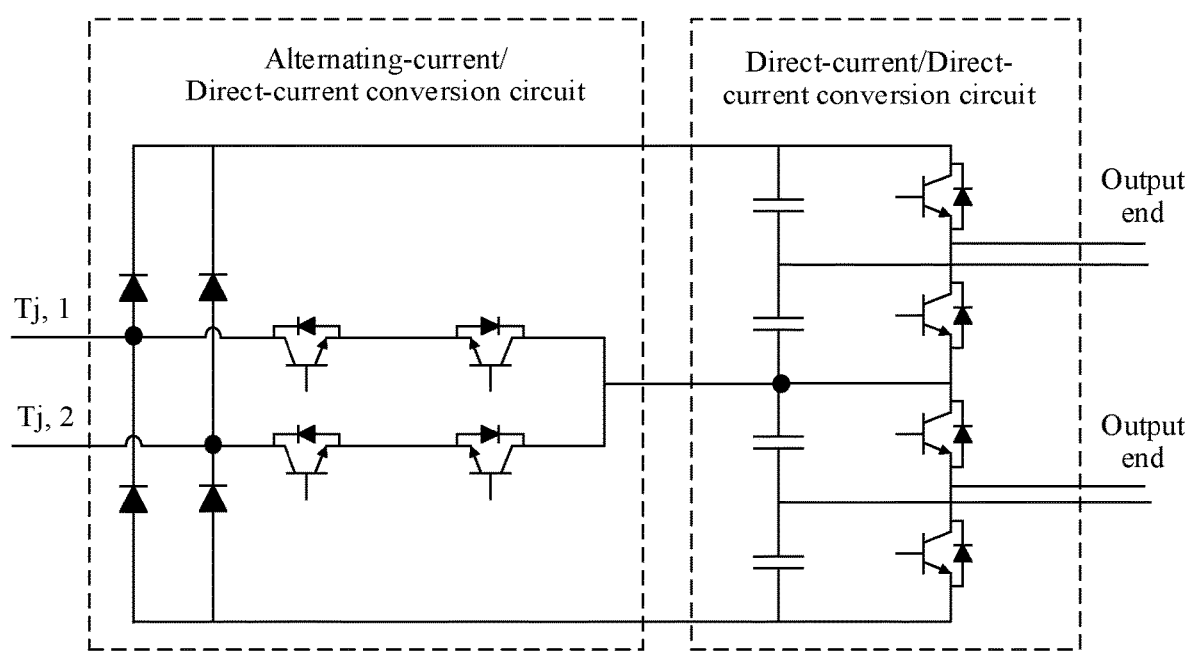
FIG. 6A is a schematic diagram of a structure of a power converter.

In the processing apparatus (32) provided in this embodiment of this application, the alternating-current/direct-current conversion circuit (42a) in each power converter (42) has a function or a capability of converting an alternating current into a direct current. In this application, the alternating-current/direct-current conversion circuit (42a) may be a circuit that implements the foregoing capability or function of converting an alternating current into a direct current, and a structure of the alternating-current/direct-current conversion circuit (42a) is not limited. In the processing apparatus (32) provided in this embodiment of this application, the direct-current/direct-current conversion circuit (42b) in each power converter (42) has a function or a capability of converting a direct current into a direct current. In this application, the direct-current/direct-current conversion circuit (42b) may be a circuit that implements the foregoing capability or function of converting a direct current into a direct current, and a structure of the direct-current/direct-current conversion circuit (42b) is not specifically limited. In some examples, a circuit structure of the power converter (42) may be shown in FIG. 6A. The alternating-current/direct-current conversion circuit (42a) may include a plurality of switching transistors and a plurality of diodes. The third controller (41) may control each switching transistor to be turned on or off, to control the alternating-current/direct-current conversion circuit (42a) to provide one or more direct-current voltages to the direct-current/direct-current conversion circuit (42b). The direct-current/direct-current conversion circuit (42b) may include a plurality of switching transistors and capacitors. The third controller (41) may control each switching transistor to be turned on or off, to control the direct-current/direct-current conversion circuit (42b) to output one or more direct-current voltages to the voltage processing circuit (34).

Figure 6B:
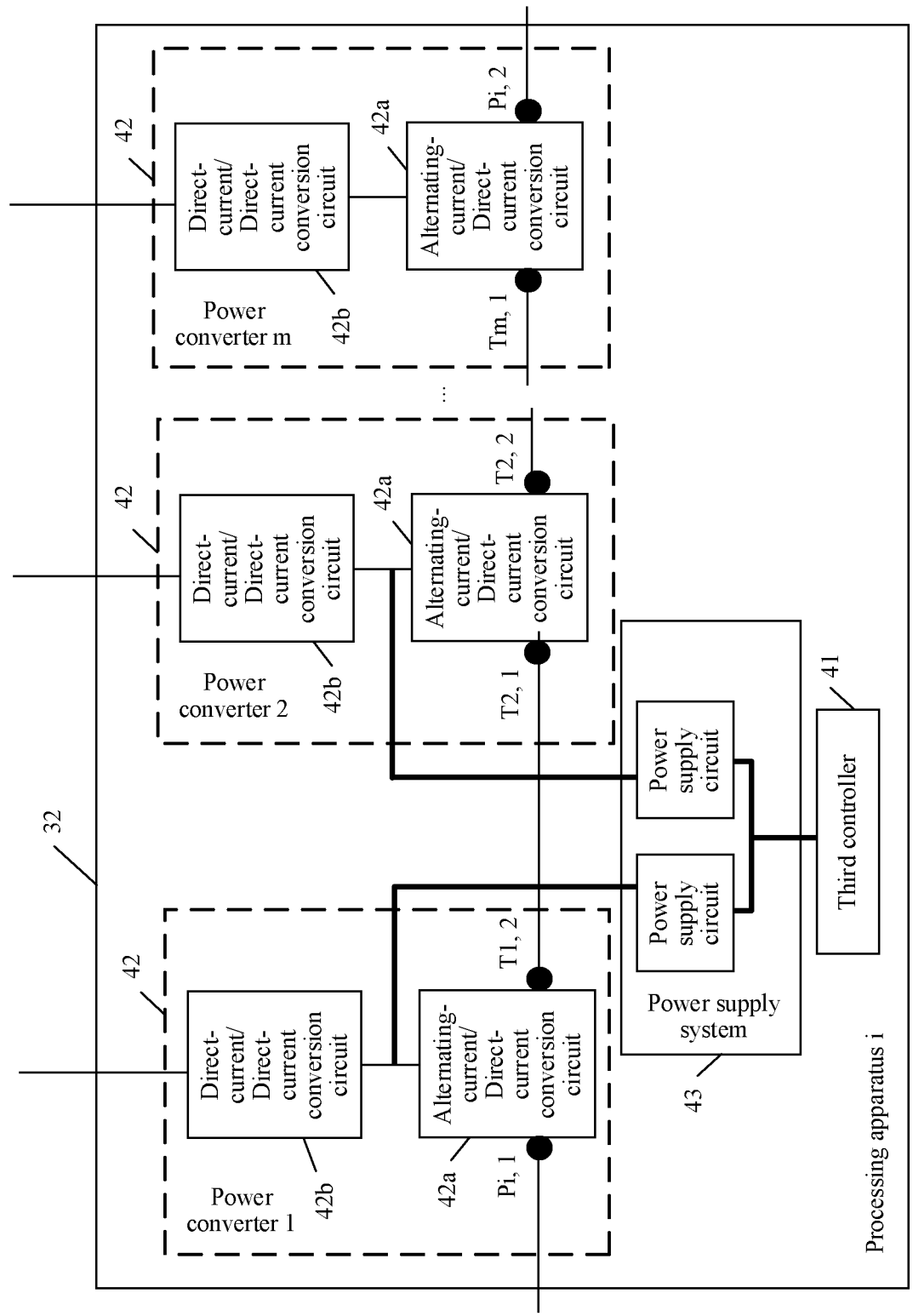
FIG. 6B is a schematic diagram of a structure of a processing apparatus including a power supply system.
Figure 6C:
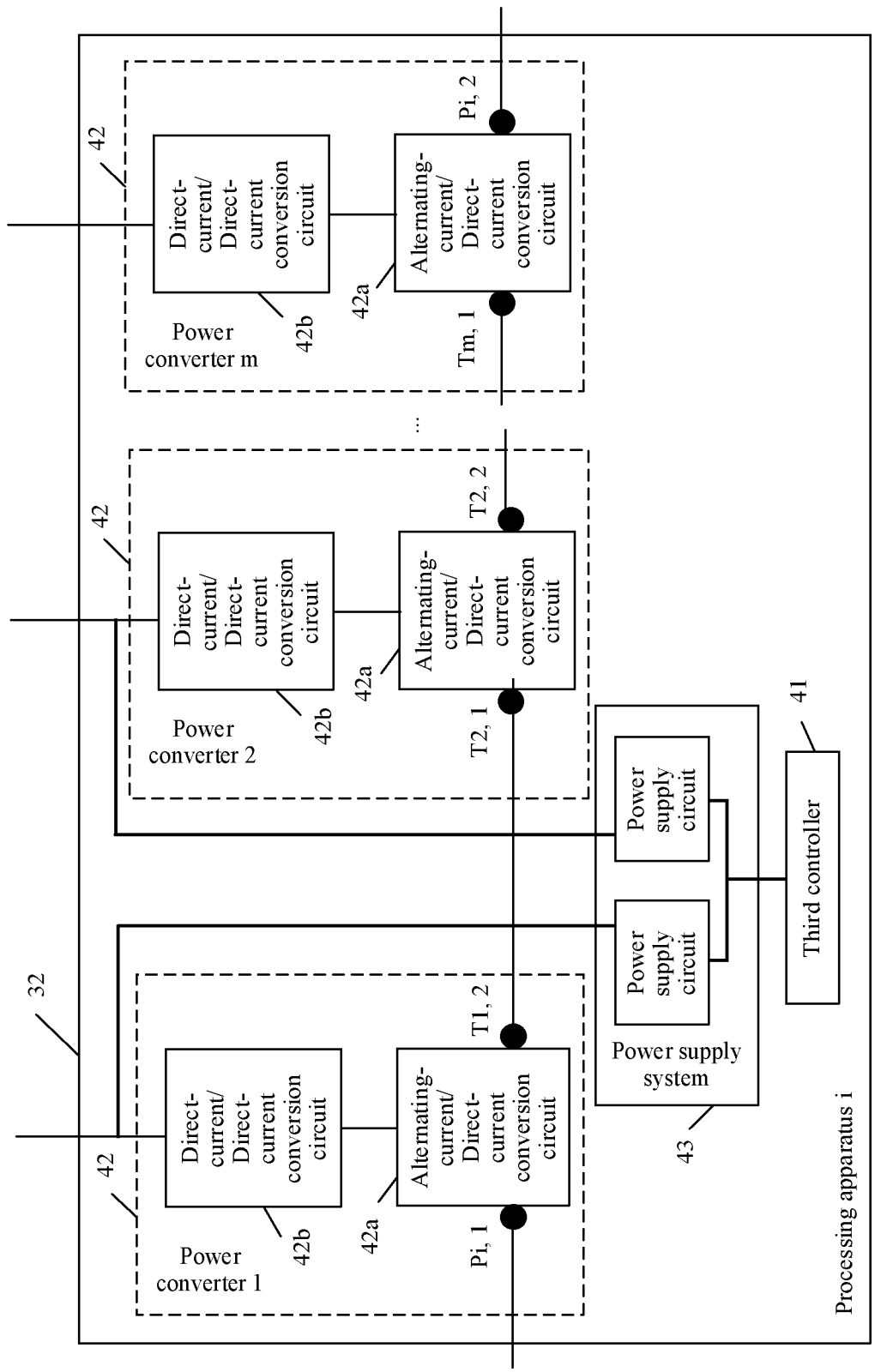
FIG. 6C is a schematic diagram of a structure of a processing apparatus including a power supply system.

The processing apparatus (32) provided in this embodiment of this application may further include a power supply system (43), configured to supply power to the third controller (41). When the processing apparatus (32) includes a plurality of power converters (42), the power supply system (43) may include at least two power supply circuits. At least two power supply branches separately obtain electric energy from different power converters (42). For example, a power supply circuit 1 may obtain electric energy from a power converter 1, and a power supply circuit 2 may obtain electric energy from a power converter 2. As shown in FIG. 6B, the power supply circuit may be connected to a bus (or a bus capacitor) between the direct-current/direct-current conversion circuit and the alternating-current/direct-current conversion circuit of the power converter (42), to obtain electric energy from the bus. Alternatively, as shown in FIG. 6C, the power supply circuit is connected to an output end of the direct-current/direct-current conversion circuit of the power converter (42), to obtain electric energy from the output end of the direct-current/direct-current conversion circuit. The power supply system (43) may also be referred to as a secondary source system, and is configured to supply power to a controller of the processing apparatus (32). In such a design, when a power supply circuit is faulty, it can be ensured that the third controller (41) can still work, so that reliability of the power conversion system is improved.

Figure 7:
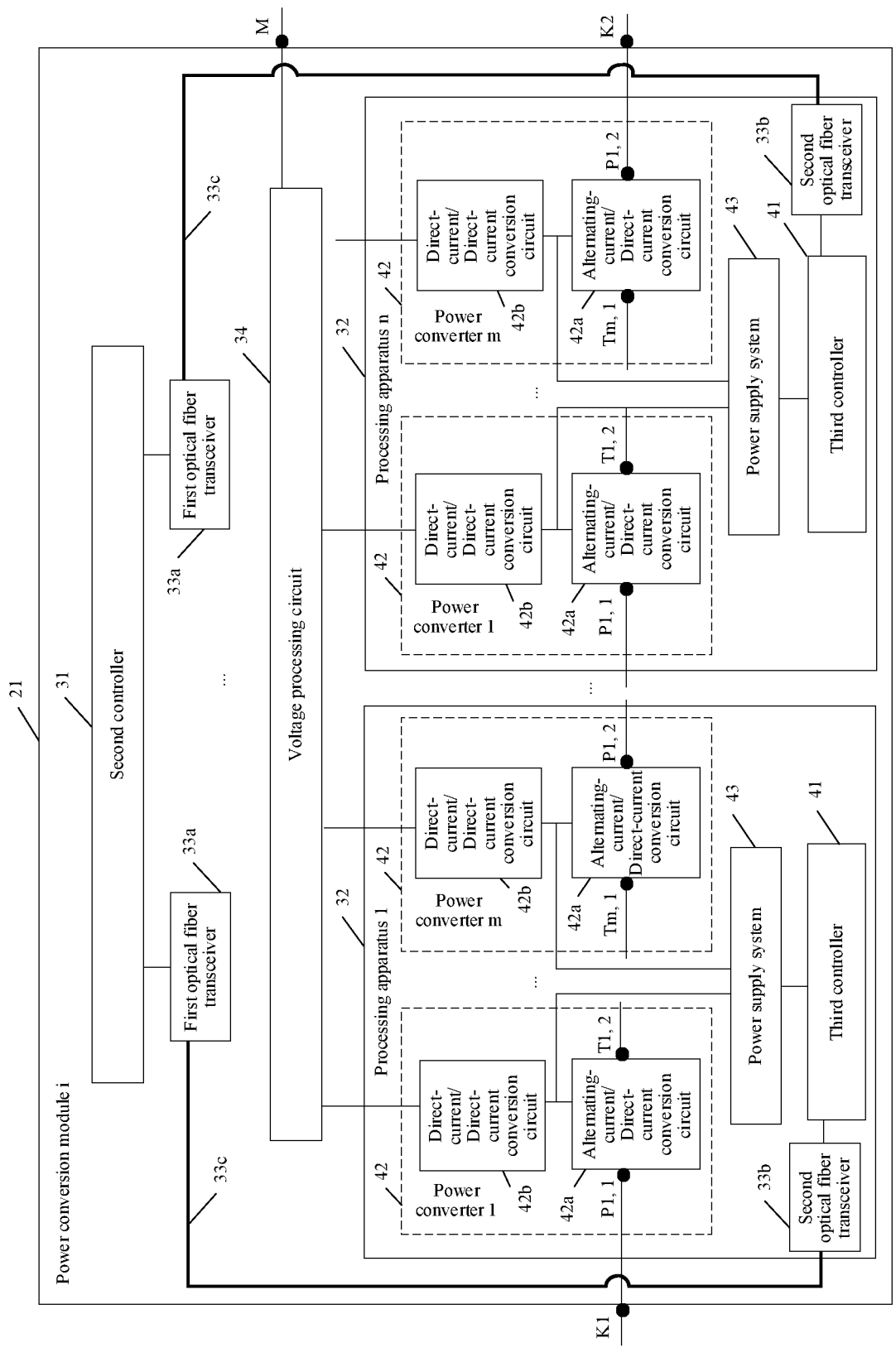
FIG. 7 is a schematic diagram of a structure of a power conversion module.

Based on the foregoing structure of the processing apparatus (32), FIG. 7 is a schematic diagram of a structure of a power conversion module (21) according to an example embodiment. A plurality of processing apparatuses (32) in the power conversion module (21) are connected in series. A power supply system (43) is disposed in each processing apparatus (32), and the power supply system (43) may obtain electric energy from a plurality of power converters, and supply power to a third controller (41) in the processing apparatus (32).

The power conversion module (21) may further include a peripheral circuit. The power supply system (43) can not only supply power to the third controller (41), but also supply power to the peripheral circuit in the power conversion module (21).

Based on the foregoing embodiment, in each power conversion module (21), the voltage processing circuit (34) may perform voltage conversion processing on a voltage output by each processing apparatus (32), and the voltage conversion processing may include one or more of isolation processing, rectification processing, or inversion processing. For example, the voltage processing circuit (34) may be connected to the output end of the power converter (42) in each processing apparatus (32), for example, is connected to the output end of the direct-current/direct-current conversion circuit of the power converter (42).

Figure 8:
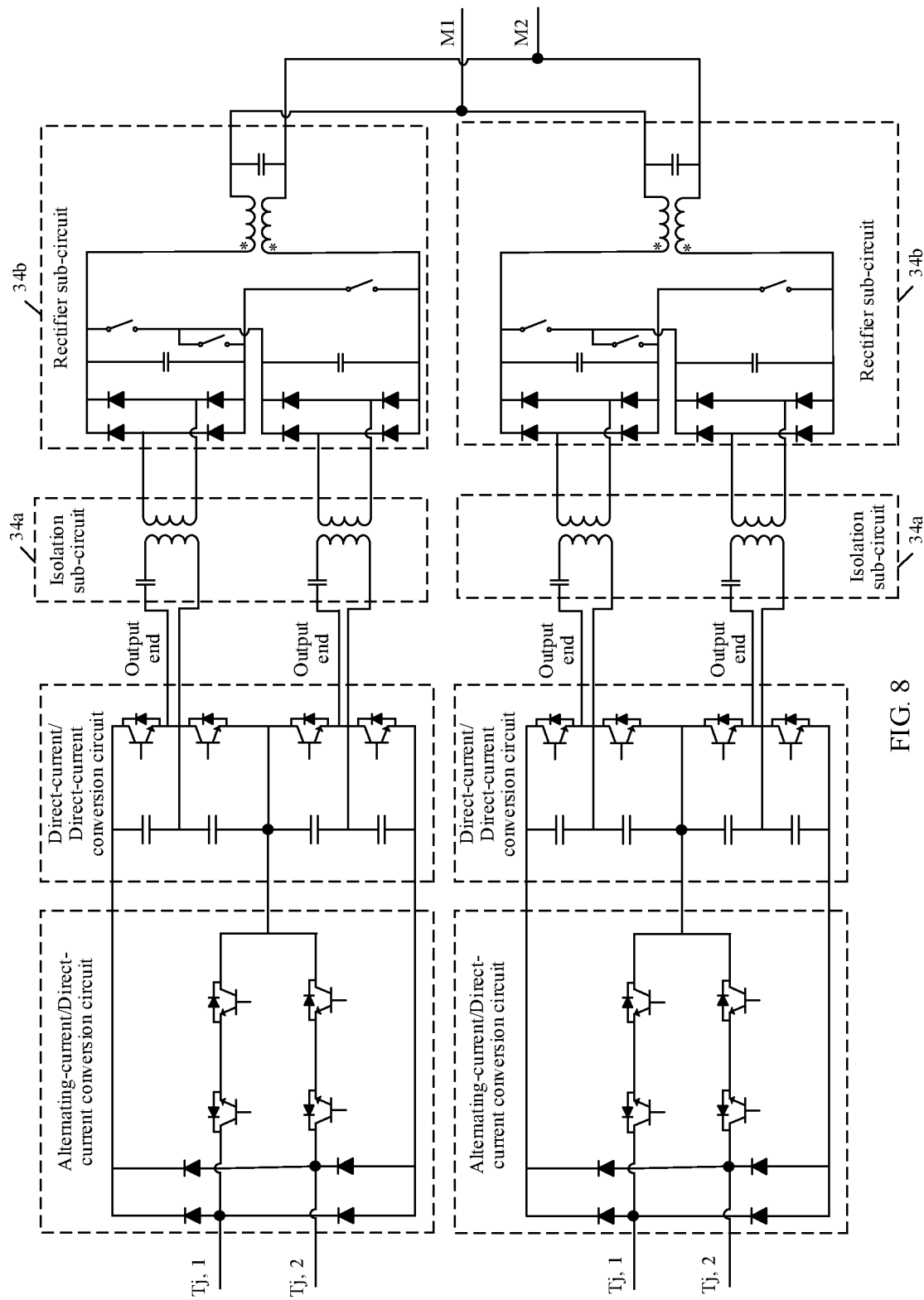
FIG. 8 is a schematic diagram of a connection relationship between a power converter and a power conversion circuit.

As shown in FIG. 8, an isolation circuit in the voltage processing circuit (34) may isolate a voltage on an output end of the power conversion module (21) from a voltage on an input end, to protect a control circuit such as the second controller (31) in the power conversion module (21), and protect a power element such as a switch in an inverter circuit. The isolation circuit may include one or more isolation sub-circuits (34a). Each power converter (42) may correspond to one isolation sub-circuit (34a). The output end (also the output end of the direct-current/direct-current conversion circuit) of the power converter (42) is connected to an input side of a corresponding isolation sub-circuit (34a).

The rectifier circuit may have a rectification capability or a rectification function. The rectifier circuit may include one or more rectifier sub-circuits 34b. Each isolation sub-circuit (34a) may correspond to one rectifier circuit (34b). An output side of the isolation sub-circuit (34a) is connected to an input side of a corresponding rectifier sub-circuit (34b). An output side of the rectifier sub-circuit (34b) is connected to an output end (M) of a power conversion module to which the power converter (42) belongs. The output end (M) of the power conversion module may include a first output end (M1) and a second output end (M2). For example, positive output of the rectifier sub-circuit (34b) is connected to a first output end (M1) of a corresponding power conversion module, that is, is connected to a positive output end of the corresponding power conversion module, and negative output of the rectifier sub-circuit 34b is connected to a second output end (M2) of the corresponding power conversion module, that is, is connected to a negative output end of the corresponding power conversion module. It can be learned that output of the rectifier sub-circuits (34b) in the voltage processing circuit (34) is in a parallel relationship. Each rectifier sub-circuit (34b) may have a rectification function or capability, and a rectified current is output through an output end (M) of a power conversion module (21) at an output end. In some examples, the second controller (31) may control a relay or a switch in the rectifier circuit, so that the voltage processing circuit (34) outputs one or more voltages. In some scenarios, the power conversion system may further include an inverter circuit, and an output end (M) of each power conversion module (21) may be connected to the inverter circuit. The inverter circuit may convert a direct current output by each power conversion module (21) into an alternating current.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power conversion system comprising:
   a first controller;
   a system output end;
   a plurality of system input ends;
   a plurality of power conversion components that is in a one-to-one correspondence with the plurality of system input ends; and
   a first bus communication apparatus coupled between each of the plurality of power conversion components and the first controller,
   wherein each of the plurality of power conversion components is configured to:
      convert an alternating current from a corresponding system input end into a direct current;
      output the direct current to the system output end; and
      communicate with the first controller using the first bus communication apparatus,
   wherein each of the plurality of power conversion components comprises:
      a first conversion input end;
      a second conversion input end;
      a second controller;
      at least one processing apparatus comprising:
         a third input end coupled to the first conversion input end; and
         a fourth input end coupled to the second conversion input end; and
         an optical fiber communication apparatus coupled between each of the at least one processing apparatus and the second controller,
      wherein each of the at least one processing apparatus is configured to:

convert the alternating current into the direct current;

output the direct current to a corresponding output end of each of the at least one processing apparatus; and communicate with the second controller using the optical fiber communication apparatus, and wherein the second controller is configured to communicate with the first controller using a second bus communication apparatus coupled between each of the at least one processing apparatus and the first controller.

2. The power conversion system of claim 1, wherein the at least one processing apparatus further comprises:

an ith processing apparatus comprising:
the fourth input end; and
a fifth input end,
wherein i is any positive integer from 2 to n−1, and wherein n is a positive integer greater than or equal to 2;

an i−1th processing apparatus comprising a sixth input end coupled to the fourth input end;

an i+1th processing apparatus comprising a seventh input end coupled to the fifth input end; and a nth processing apparatus comprising an eighth input end coupled to the second conversion input end.

3. The power conversion system of claim 2, wherein each of the plurality of power conversion components comprises:

the first conversion input end coupled to the corresponding system input end;

the second conversion input end coupled to other second input ends of remaining power conversion components; and the corresponding output end coupled to the system output end.

4. The power conversion system of claim 1, wherein each of the plurality of power conversion components comprises:

the first conversion input end coupled to the corresponding system input end;

the second conversion input end coupled to other second input ends of remaining power conversion components; and the corresponding output end coupled to the system output end.

5. The power conversion system of claim 1, wherein each of the at least one processing apparatus further comprises:

a third controller; and at least one power converter, wherein each of the at least one power converter is configured to:

convert a received alternating current into the direct current under control of the third controller; and output the direct current to a second output end of a corresponding power converter, wherein the third controller is configured to:

control each of the at least one power converter; and communicate with the second controller using the optical fiber communication apparatus.

6. The power conversion system of claim 5, wherein each of the at least one processing apparatus further comprises:

a first power converter comprising the third input end;

a j−1th power converter comprising a fifth input end, wherein j is any positive integer from 2 to m−1, and wherein m is a quantity of the at least one power converter;

a jth power converter comprising:
a sixth input end coupled to the fifth input end; and
a seventh input end;

a j+1th power converter comprising an eighth input end coupled to the sixth seventh input end; and an mth power converter comprising the fourth input end.

7. The power conversion system of claim 5, wherein each of the at least one processing apparatus comprises: further comprises one power converter; and wherein the one power converter comprises:
a first power converter input end coupled to the third input end; and
a second power converter input end that is the fourth input end.

8. The power conversion system of claim 5, wherein each of the at least one processing apparatus comprises:

a plurality of power converters; and a power supply system configured to:
obtain electric energy from at least two power converters of the power converters in each of the at least one processing apparatus; and
supply power to the third controller.

9. The power conversion system of claim 8, wherein the power supply system comprises:

a third output end coupled to the third controller; and at least two power supply circuits that are in a one-to-one correspondence with the at least two power converters, wherein each of the at least two power supply circuits comprises:
a first input end coupled to a corresponding power converter; and
a fourth output end coupled to the third output end.

10. The power conversion system of claim 8, wherein the plurality of power conversion components further comprises a voltage processing circuit, and wherein each of the plurality of power converters comprises:

an alternating-current/direct-current conversion circuit comprising:
a first AC/DC input end;
a second AC/DC input end; and
a third AC/DC end; and a direct-current/direct-current conversion circuit comprising:
a DC/DC input end coupled to the third AC/DC end using a bus; and
a DC/DC output end coupled to the voltage processing circuit.

11. The power conversion system of claim 9, wherein the plurality of power conversion components further comprises a voltage processing circuit, and wherein each of the plurality of power converters comprises:

an alternating-current/direct-current conversion circuit comprising:
a first AC/DC input end;
a second AC/DC input end; and
a third AC/DC end; and a direct-current/direct-current conversion circuit comprising:
a DC/DC input end coupled to the third AC/DC end using a bus; and
a DC/DC output end coupled to the voltage processing circuit.

12. The power conversion system of claim 10, further comprising a power supply branch comprising a power supply branch input end coupled to a second bus between the alternating-current/direct-current conversion circuit and the direct-current/direct-current conversion circuit in a corresponding power converter.

13. A power conversion component in a power conversion system and comprising:
- a second controller;
- a first input end;
- a second input end;
- a plurality of processing apparatuses comprising a plurality of output ends;
- a first processing apparatus of the plurality of processing apparatuses comprising a third input end coupled to the first input end;
- an ith processing apparatus of the plurality of processing apparatuses comprising:
  - a fourth input end; and
  - a fifth input end,
    - wherein i is any positive integer from 2 to n−1, and wherein n is a positive integer greater than or equal to 2;
- an i−1th processing apparatus of the plurality of processing apparatuses comprising a sixth input end coupled to the fourth input end;
- an i+1th processing apparatus of the plurality of processing apparatuses comprising a seventh input end coupled to the fifth input end;
- an nth processing apparatus of the plurality of processing apparatuses comprising an eighth input end coupled to the second input end; and
- an optical fiber communication apparatus coupled between each of the plurality of processing apparatuses and the second controller,
- wherein each of the plurality of processing apparatuses is configured to:
  - convert an alternating current into a direct current;
  - output the direct current to the output end; and
  - communicate with the second controller using the optical fiber communication apparatus, and
- wherein the second controller is configured to communicate with a first controller of the power conversion system using a bus communication apparatus coupled between each of the plurality of processing apparatuses and the first controller.

14. A processing apparatus implemented in a power conversion component in a power conversion system, wherein the processing apparatus comprises:
- a first controller;
- a plurality of power converters, wherein each of the power converters comprises a first output end and configured to:
  - convert an alternating current into a direct current under control of the first controller; and
  - output the direct current to the first output end,
- wherein the first controller is configured to:
  - control each of the power converters; and
  - communicate with a second controller of the power conversion component using an optical fiber communication apparatus coupled between the processing apparatus and the second controller; and
- a power supply system comprising:
  - a second output end coupled to the first controller; and
  - at least two power supply circuits that are in a one-to-one correspondence with at least two power converters of the plurality of power converters, wherein each of the at least two power supply circuits comprises:
    - an input end coupled to a corresponding power converter; and
    - a third output end coupled to the second output end,
  - wherein the power supply system is configured to:
    - obtain electric energy from the at least two power converters; and
    - supply power to the first controller.

15. The power conversion system of claim 10, further comprising a power supply branch comprising a power supply branch fourth input end coupled to a fourth output end of the direct-current/direct-current conversion circuit in a corresponding power converter.

16. The processing apparatus of claim 14, further comprising:
- a first input end;
- a second input end;
- a first power converter comprising a third input end that is the first input end;
- a j−1th power converter comprising a fourth input end, wherein j is any positive integer from 2 to m−1, and wherein m is a quantity of the plurality of power converters;
- a jth power converter comprising:
  - a fifth input end coupled to the fourth input end; and
  - a sixth input end;
- a j+1th power converter comprising a seventh input end coupled to the sixth input end; and
- an mth power converter comprising an eighth input end that is the second input end.

17. The power conversion component of claim 13, further comprising a voltage processing circuit;
- an alternating-current/direct-current conversion circuit comprising:
  - a first AC/DC input end;
  - a second AC/DC input end; and
  - a third AC/DC end; and
- a direct-current/direct-current conversion circuit comprising:
  - a DC/DC input end coupled to the third AC/DC end using a bus; and
  - a DC/DC output end coupled to the voltage processing circuit.

18. The power conversion component of claim 17, further comprising a power supply branch comprising a ninth input end coupled to a second bus between the alternating-current/direct-current conversion circuit and the direct-current/direct-current conversion circuit in a corresponding power converter.

19. The power conversion component of claim 17, further comprising a power supply branch comprising a ninth input end coupled to a fourth output end of the direct-current/direct-current conversion circuit in a corresponding power converter.

20. The processing apparatus of claim 14, wherein the power conversion component further comprises a voltage processing circuit, and wherein each of the plurality of power converters comprises:
- a first input end;
- a second input end;
- an alternating-current/direct-current conversion circuit comprising:
  - a first AC/DC input end;
  - a second AC/DC input end; and
  - a third AC/DC end; and
- a direct-current/direct-current conversion circuit comprising:
  - a third input end coupled to the third AC/DC end using a bus; and a fourth output end coupled to the voltage processing circuit.

* * * * *

UNITED STATES PATENT AND TRADEMARK OFFICE
CERTIFICATE OF CORRECTION

PATENT NO. : 12,255,536 B2  
APPLICATION NO. : 17/979058  
DATED : March 18, 2025  
INVENTOR(S) : Zhuyong Huang and Xiaofei Zhang Page 1 of 1

It is certified that error appears in the above-identified patent and that said Letters Patent is hereby corrected as shown below:

In the Claims

Claim 6, Column 18, Line 2: "the sixth seventh input" should read "the seventh input"

Claim 6, Column 18, Line 5: "apparatus comprises: further" should read "apparatus further"

Claim 15, Column 20, Line 6: "branch fourth input end" should read "branch input end"

Signed and Sealed this  
Sixth Day of May, 2025

Coke Morgan Stewart  
*Acting Director of the United States Patent and Trademark Office*